(12) United States Patent
Morii et al.

(10) Patent No.: US 7,032,561 B2
(45) Date of Patent: Apr. 25, 2006

(54) ENGINE FOR SNOWMOBILE

(75) Inventors: Hideshi Morii, Hamamatsu (JP); Toshio Hayashi, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 11 days.

(21) Appl. No.: 10/849,854

(22) Filed: May 21, 2004

(65) Prior Publication Data

US 2004/0237927 A1 Dec. 2, 2004

(30) Foreign Application Priority Data

May 27, 2003 (JP) .............................. 2003-149311
Jun. 11, 2003 (JP) .............................. 2003-166909

(51) Int. Cl.
| | | |
|---|---|---|
| F02F 7/00 | (2006.01) | |
| B62M 27/02 | (2006.01) | |
| R02F 1/10 | (2006.01) | |

(52) U.S. Cl. ................................. 123/195 AC; 180/190
(58) Field of Classification Search ............. 123/193.3, 123/195 R, 195 AC, 195 H, 196 R, 196 M, 123/198 E; 180/182, 190

See application file for complete search history.

(56) References Cited

U.S. PATENT DOCUMENTS

| 4,649,873 A | * | 3/1987 | Amano ................... 123/196 R |
| 4,811,705 A | * | 3/1989 | Ono et al. ............ 123/195 AC |
| 5,743,219 A | | 4/1998 | Iio et al. |
| 6,644,261 B1 | * | 11/2003 | Morii et al. ............ 123/195 R |
| 2002/0027029 A1 | * | 3/2002 | Yatagai et al. .............. 180/182 |
| 2004/0188161 A1 | * | 9/2004 | Yatagai et al. .............. 180/190 |

* cited by examiner

*Primary Examiner*—Willis R. Wolfe, Jr.
(74) *Attorney, Agent, or Firm*—Oblon, Spivak, McClelland, Maier & Neustadt, P.C.

(57) ABSTRACT

A snowmobile provided with a water-cooling type engine has a body, half of which is covered by an engine hood so as to form an engine room therein. The water-cooling engine is transversely mounted in the engine room, and the engine includes a crank case, a cylinder block disposed above the crank case, a cylinder head disposed above the cylinder block, and a crank shaft rotatably supported in a manner inclined rearward. The cylinder head is covered by a head cover so that a mating surface thereof is inclined forward such that a front side of the cylinder head is lower, in level, than a rear side thereof.

9 Claims, 11 Drawing Sheets

ENGINE FOR SNOWMOBILE

BACKGROUND OF THE INVENTION

1. Field of the Invention

The present invention relates to a structure of an engine of a vehicle, particularly of snowmobile.

2. Related Art

In a snowmobile mounted with the water-cooling type engine in a transverse attitude, if the engine has a high full height, a head cover arranged to the engine top portion adversely affects an engine hood, headlight or like disposed further above the engine. In order to obviate such defect, the engine of this type is arranged in an inclined manner in an engine room such as shown in Japanese Patent Laid-open (KOKAI) Publication No. 2002-371847.

Further, the engine head cover of this type is formed with a plug hole for mounting an ignition plug thereto. Water is likely stored in this portion, so that a cylinder head is formed with a drain passage, for example, on an exhaust port side as disclosed in Japanese Patent Laid-open (KOKAI) Publication No. 2000-110660.

However, in the arrangement in which the engine is inclined forward, the front side of the engine hood will take a high position, which leads to an increasing of air resistance. In this meaning, it may be desired to incline the engine rearward. However, in a case where the engine is inclined rearward over some extent, it adversely affects the arrangement of ducts and wiring for an intake system of the engine, and there is a fear of interfering with the engine, a fuel tank and the like. In this meaning, there is a limit for rearward inclination of the engine.

Furthermore, in a case where a drain (drainage) passage is formed on the exhaust port side of the cylinder head, it is difficult to locate a cooling water jacket around the exhaust port. As a result, the exhaust port will be exposed to a high temperature from the engine exhaust gas, which may result in thermal deformation of the surrounding of the exhaust port and the mating portion to the cylinder block.

On the other hand, in a snowmobile mounted with a water-cooling type engine in a transverse attitude, a cooling water outlet is provided at a portion on a power take-out side of the engine and the outlet is covered by a cover provided with a thermostat as disclosed in the above-mentioned Japanese Patent Laid-open (KOKAI) Publication No. 2002-371847.

In such an engine, the cover covering the cooling water outlet projects in a width direction of the engine, which expands the width of the engine structure, which adversely affects an engine hood design.

That is, for example, on the power take-out side of the engine, a clutch is arranged near the engine, and accordingly, it is necessary to take care the arrangement of cooling ducts such as cooling water hose or bypass hose, wirings of water temperature sensor and the like to prevent the clutch from contacting to the ducts or wirings.

Further, a cam-chain is also arranged in the engine on the side opposite to the power take-out side of the engine, and according to such arrangement, it is difficult to form the cooling water outlet and the thermostat on this opposite side.

SUMMARY OF THE INVENTION

The present invention was conceived in consideration of the defects or inconveniences encountered in the prior art mentioned above and an object of the present invention is therefore to provide an engine of a snowmobile having improved compact structures in which parts or elements disposed on the rear side of the engine can be easily arranged even if the engine is disposed in an inclined fashion.

Another object of the present invention is to provide an engine of a snowmobile having a cylinder head in which water stored in a plug hole can be easily drained without degrading the engine cooling performance.

A further object of the present invention is to provide an engine of a snowmobile having a cooling structure in which compact arrangement of hose and the like can be easily made.

The above and other objects of the present invention can be achieved according to the present invention by providing, in one aspect, an engine of a snowmobile in which a front half of a snowmobile body is covered by an engine hood so as to form an engine room therein, in which a water-cooling engine is mounted transversely, the engine comprising:

a crank case including an upper crank case half and a lower crank case half which are mated or joined together at mating surfaces thereof;

a cylinder block disposed above the crank case;

a cylinder head disposed above the cylinder block; and a crank shaft rotatably supported at the mating surfaces of the upper and lower crank case halves in a manner inclined rearward, wherein the cylinder head is covered by a head cover so that a mating surface thereof is inclined forward such that a front side of the cylinder head is lower, in level, than a rear side thereof.

In a preferred embodiment of this aspect, it is desirable that the cylinder head is provided with an intake port extending upward from a rear side portion of the cylinder head and an exhaust port extending downward from a horizontal plane from a front side portion of the cylinder head. The cylinder head may be formed with a plug hole for inserting an ignition plug and a drain port at the rear side portion thereof, a drain passage is formed so as to extend downward from the plug hole to the drain port, and the exhaust port is branched into two portions between which a cooling water jacket is arranged.

According to this aspect of the present invention, in the cylinder head structure of the snowmobile engine, the front of the engine hood is lowered, and therefore, an air resistance can be reduced while the interference of the top of the engine with instruments above the engine being prevented.

In addition, since the intake port has the down-draft effect, the output power of the engine is increased and the arrangement and piping of intake instruments can be easily made.

Furthermore, the water penetrating into the plug hole can be smoothly drained with substantially no deformation of the cylinder head due to the exhaust heat.

The above objects can be also achieved according to the present invention by providing, in another aspect, an engine of a snowmobile in which a front half of a snowmobile body is covered by an engine hood so as to form an engine room therein, in which a water-cooling engine is mounted transversely, the engine comprising:

a crank case including an upper crank case half and a lower crank case half which are mated or joined together at mating surfaces thereof;

a cylinder block disposed above the crank case;

a cylinder head disposed above the cylinder block; and a crank shaft rotatably supported at the mating surfaces of the upper and lower crank case halves in a manner inclined rearward, wherein the cylinder head is provided, at a rear side portion thereof, with a cooling water outlet and a thermostat.

In a preferred embodiment of this aspect, it is desirable that the thermostat is arranged above a starter motor, which is disposed below a throttle body disposed rear upper portion of the engine and below the engine rear portion, and between bilateral cylinders of the engine. A plurality of intake ports may be formed to a rear surface portion of the cylinder head. In addition, a bypass outlet port of cooling water and a temperature sensor for cooling water may be disposed to rear surface portions of the cylinder head, the bypass outlet port and the temperature sensor being arranged to be opposite to the thermostat with one of the intake ports interposed therebetween.

According to the structure of this aspect, in the cooling structure of the snowmobile engine, since the cooling water piping and the water-temperature wiring are made on the rear side of the engine, the interference with instruments arranged on the side of the engine can be easily avoided, and in addition, the piping and the wiring can be simplified and reduced in length. Furthermore, the engine and the engine hood of the snowmobile can be also made compact.

The nature and further characteristic features will be made more clear from the following descriptions made with reference to the accompanying drawings.

DESCRIPTION OF THE PREFERRED EMBODIMENTS

Preferred embodiments of the present invention will be described hereunder with reference to the accompanying drawings.

Figure 1:
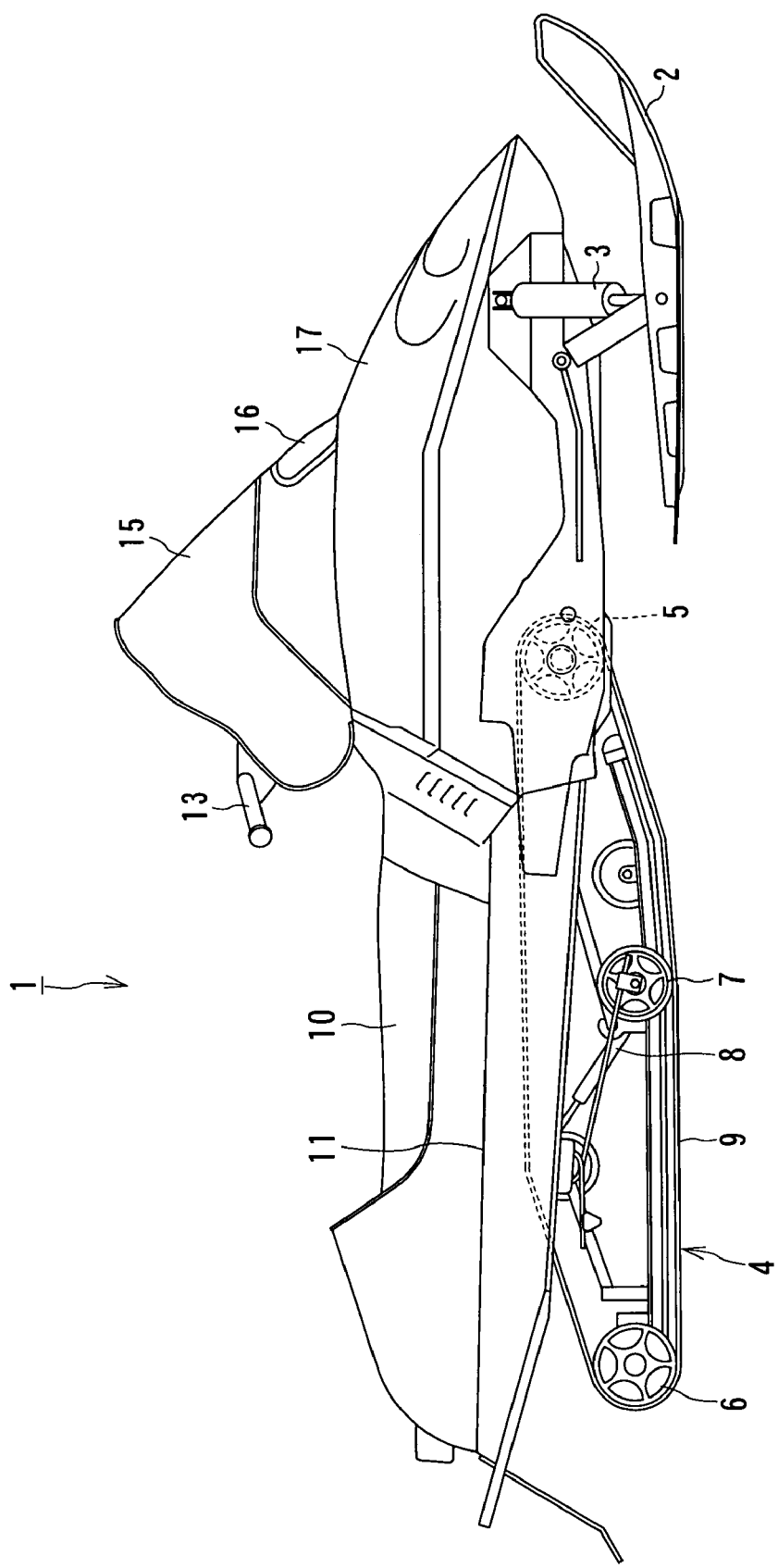
FIG. 1 is a right side view of a snowmobile provided with a snowmobile engine according to one embodiment of the present invention.
Figure 2:
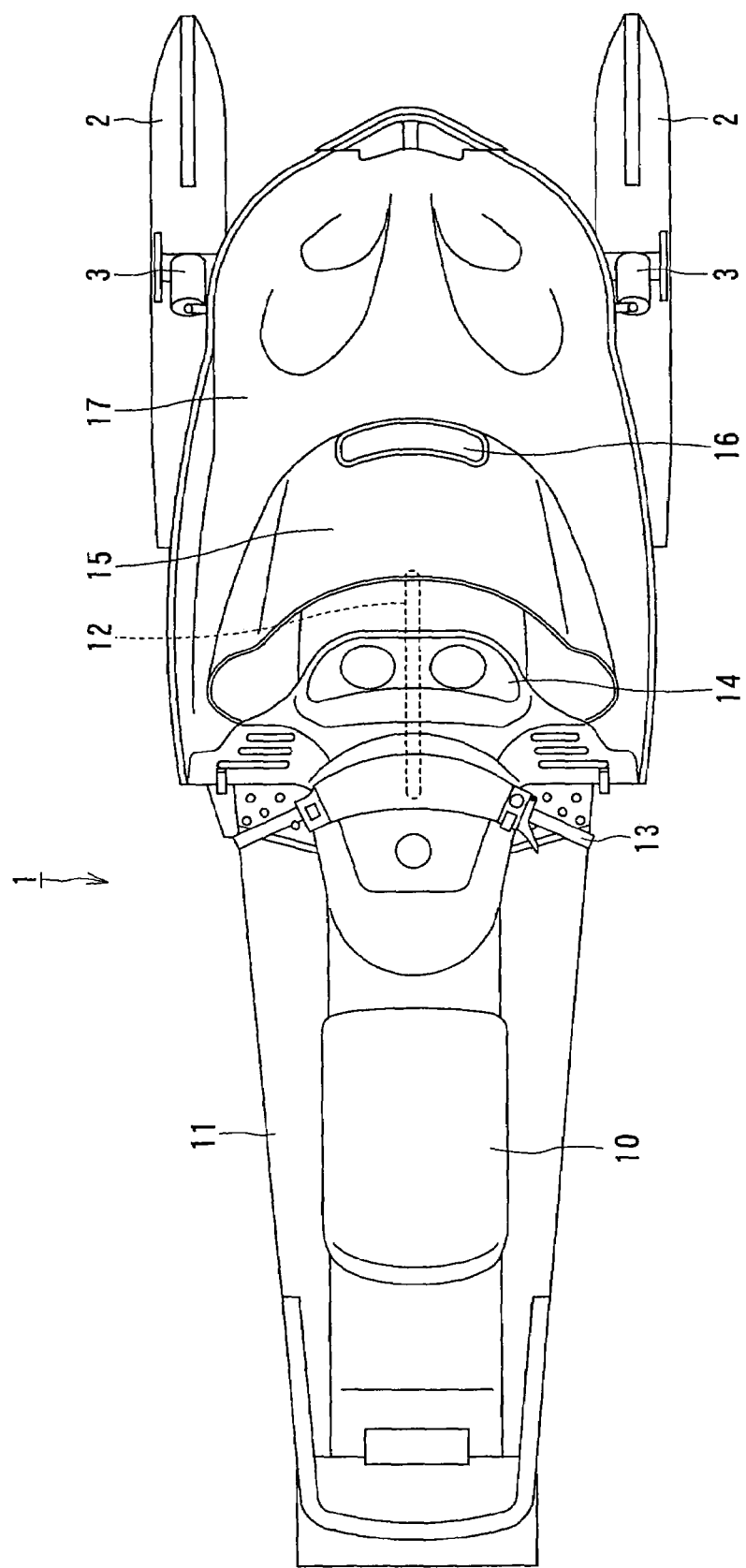
FIG. 2 is a plan view of the snowmobile of FIG. 1.
Figure 3:
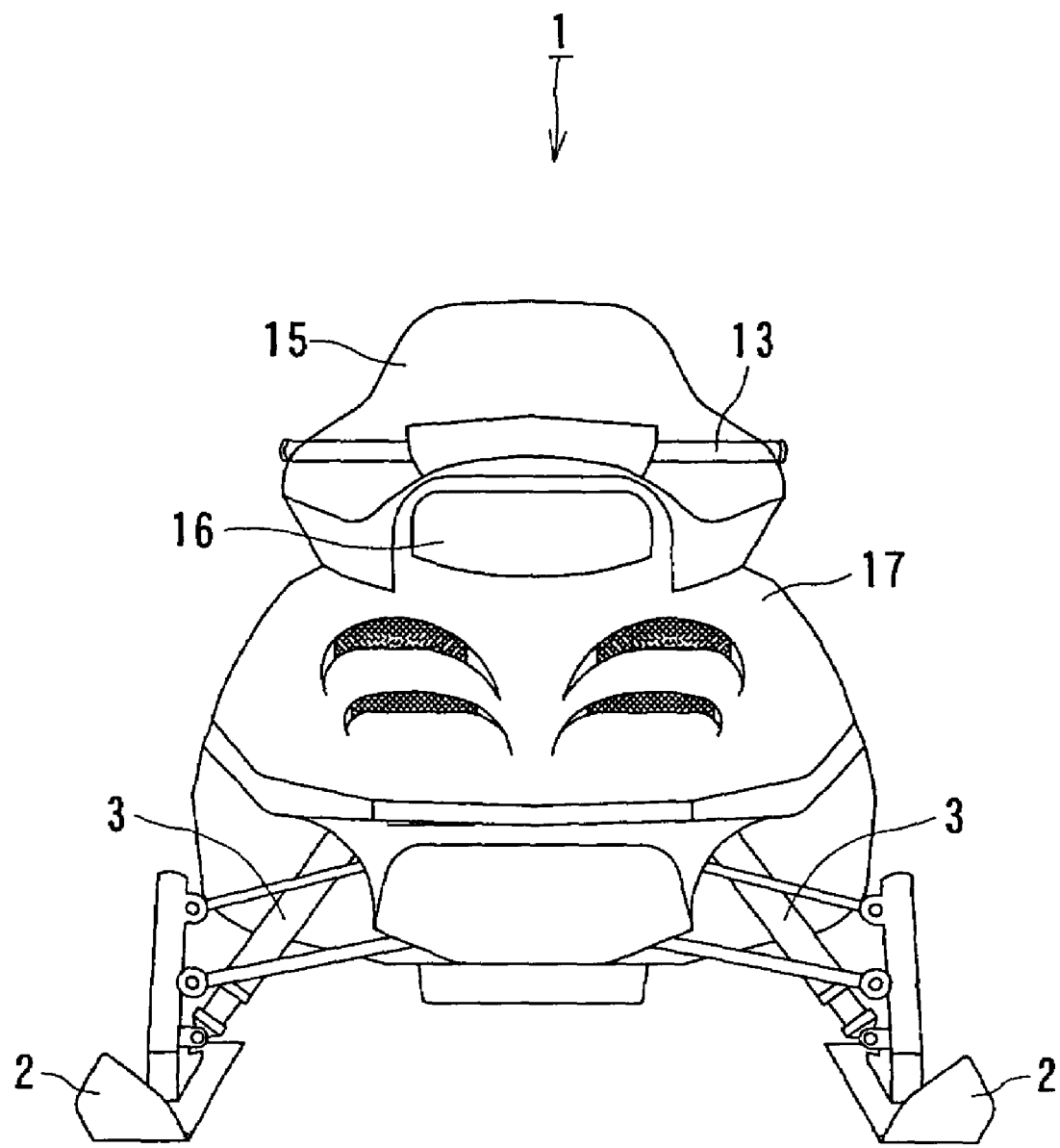
FIG. 3 is a front view of the snowmobile.

As shown in FIGS. 1 to 3, a snowmobile 1 is provided with a lateral pair of steering skids 2 disposed below the front portion of a snowmobile body extending longitudinally therealong so as to laterally steer the snowmobile 1. The steering skids 2 are shock-absorbably supported by front suspension mechanisms 3. On the other hand, a crawler mechanism 4 is arranged below the rear portion of the vehicle body. The crawler mechanism 4 includes a drive wheel 5 arranged in the front portion, a following wheel 6 arranged in the rear portion, a plurality of intermediate wheels 7 arranged between these moving wheels 5 and 6, a rear suspension mechanism 8 for shock-absorbably supporting the intermediate wheels 7, and a crawler 9 stretched around these wheels.

A longitudinally extending driver's seat 10 is provided above the crawler mechanism 4, and steps 11 lower by one step than the driver's seat 10 are arranged on both sides of the driver's seat 10. Furthermore, in front of the driver's seat 10, a handle bar 13 is provided for operating the steering skids 2 with a steering shaft 12 therebetween. In front of the handle bar 13, a meter panel 14 and a windshield 15 are arranged, and a headlight 16 is disposed at a front lower end of the windshield 15 and in front of the meter panel 14.

The front upper half of the vehicle body is covered with a retractable engine hood 17 so as to form an engine room 18 therein, and an engine 19 is mounted in this engine room 18. The engine hood 17 has a shape downward inclining toward the front side from the front bottom portion of the headlight 16, as the highest position, so as not to intercept an optical axis of the headlight 16.

Figure 4:
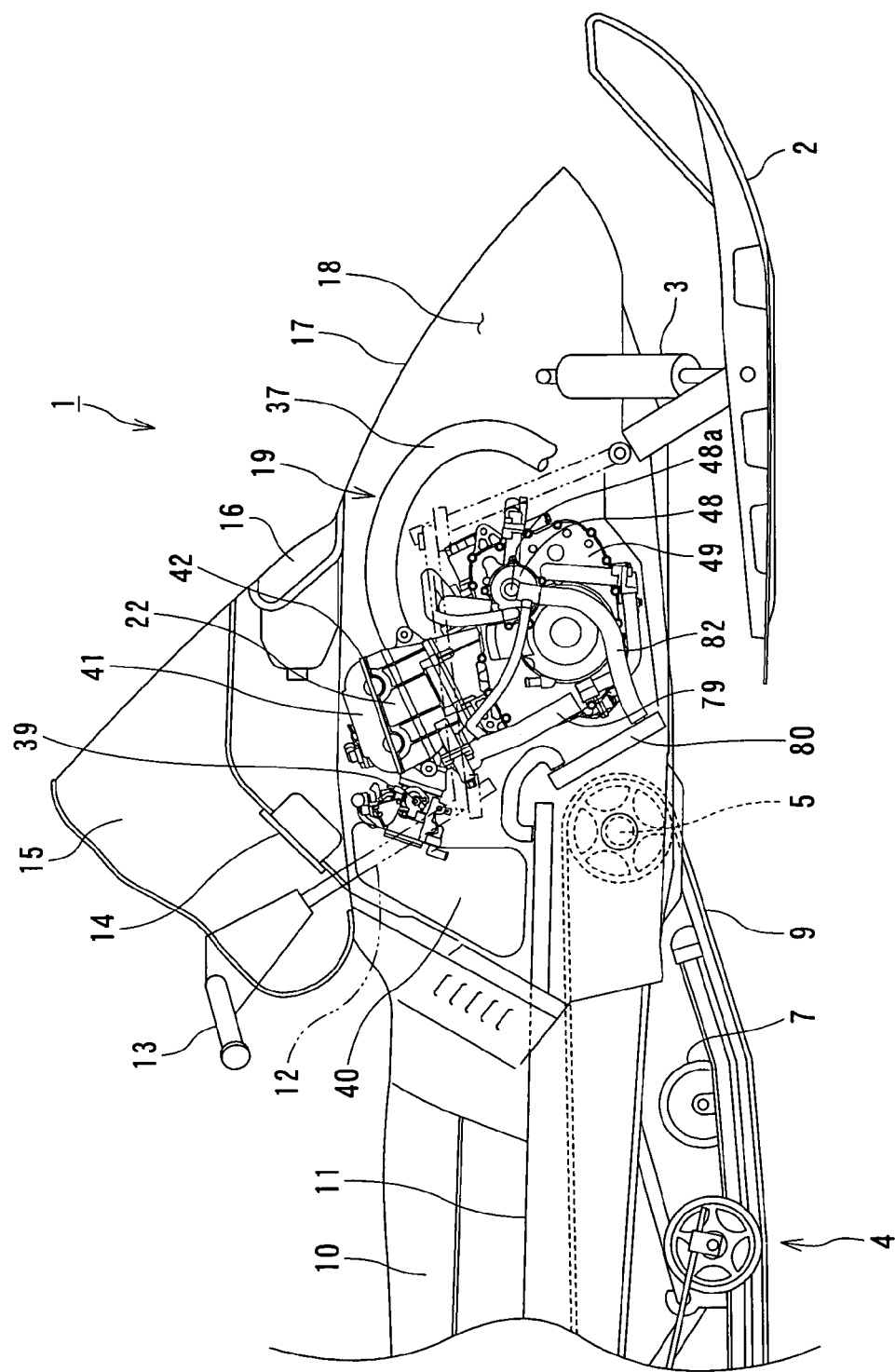
FIG. 4 is an illustration of a front part of the snowmobile in which an engine room accommodated with the engine is shown in an opened state.
Figure 5:
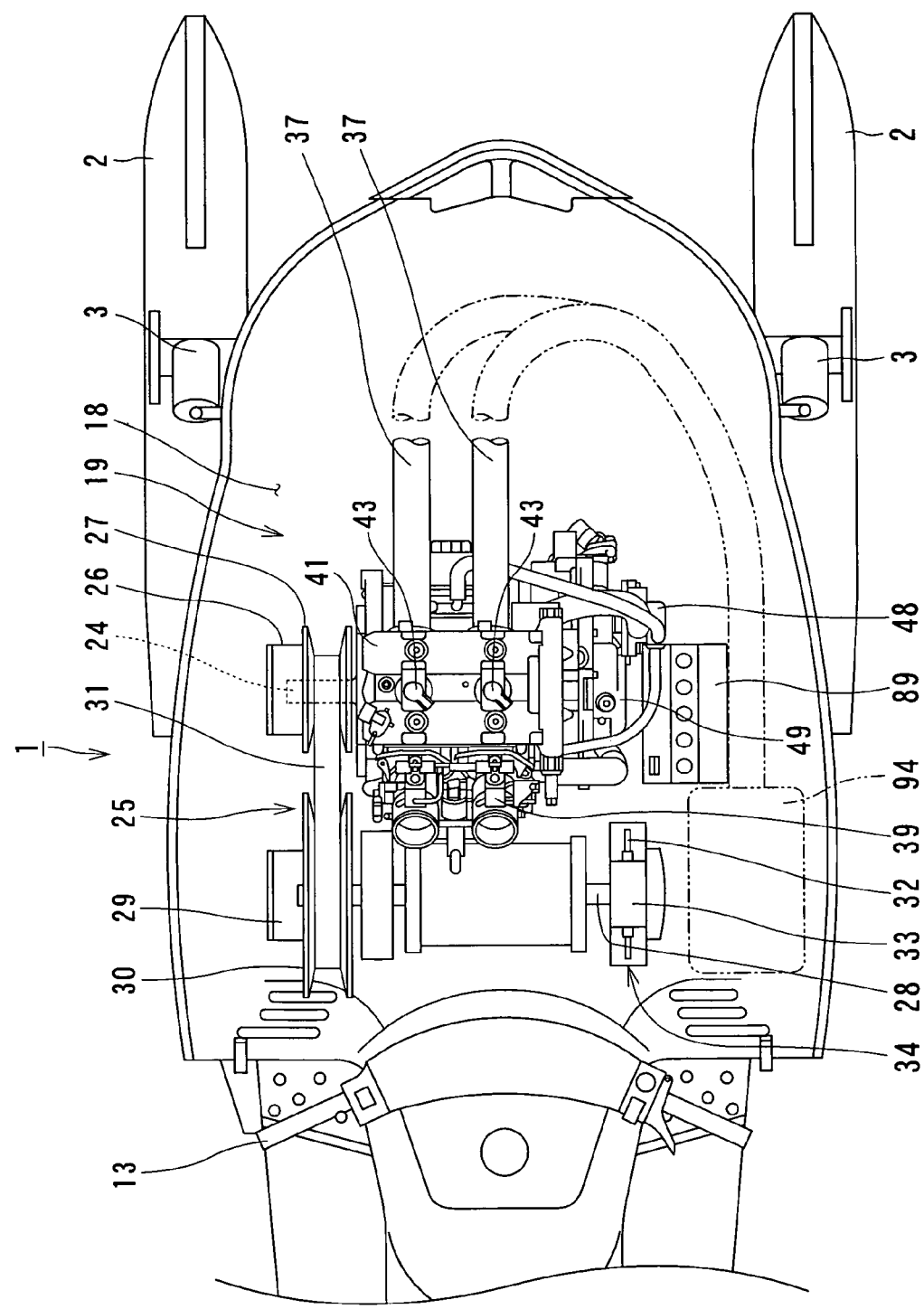
FIG. 5 is a plan view, in an enlarged scale, of the engine room.
Figure 6:
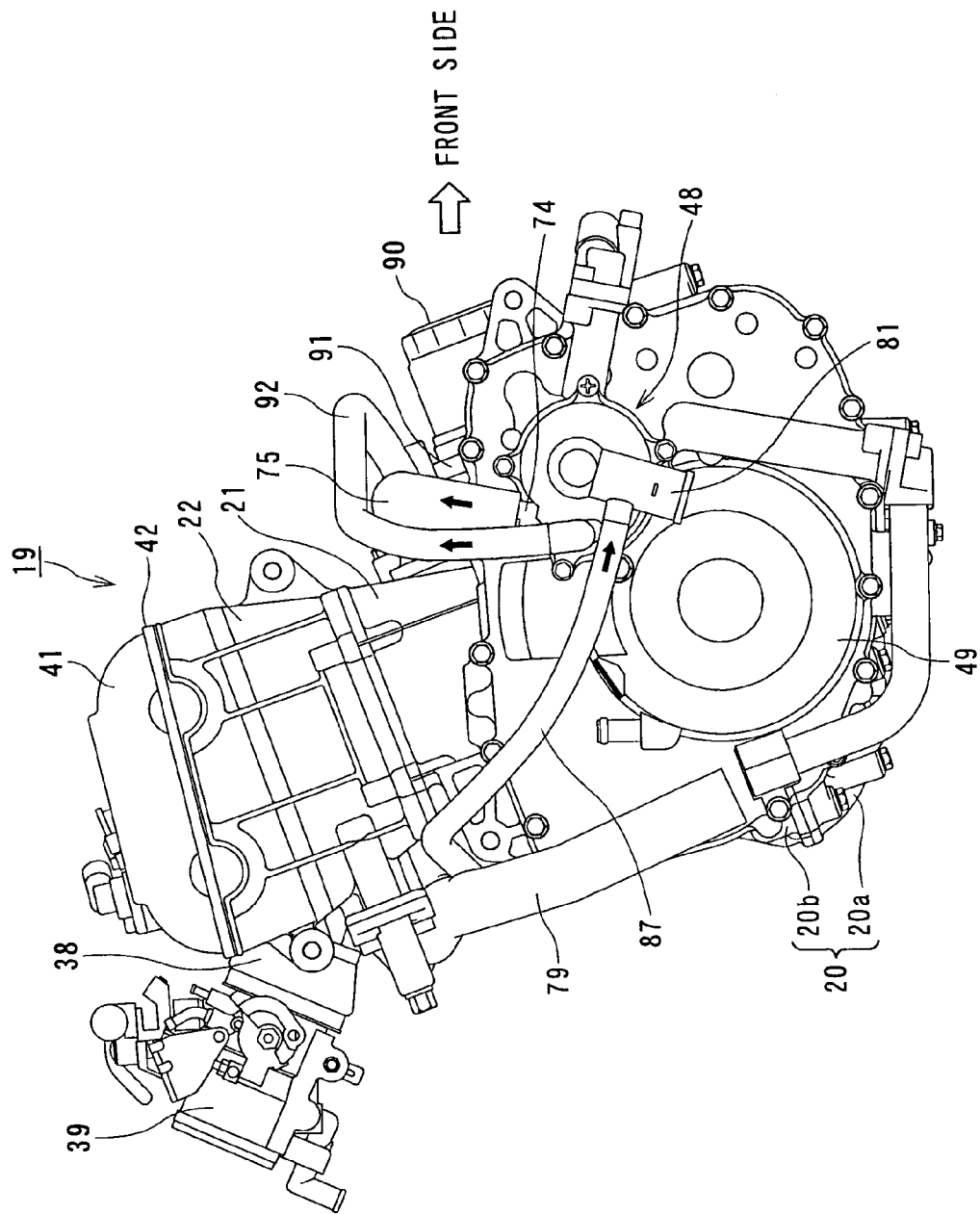
FIG. 6 is a right side view of the engine, in an enlarged scale, of FIG. 4.

With reference to FIGS. 4 to 6, the engine 19 is a four-stroke-cycle juxtaposed multi-cylinder engine (two-cylinder engine in this illustrated embodiment) including a crank case 20 which is dividable into a lower crank case (lower crank case half) 20a and an upper crank case (upper crank case half) 20b mounted on the lower crank case 20a. A cylinder block 21 is disposed above the crank case 20 to be integral with the upper crank case 20b, and a cylinder head 22 is also placed on the cylinder block 21.

The engine 19 is transversely arranged so that a crank shaft 24 of the engine 19 is rotatably journaled on the juncture, i.e., mating surface, 23 between the lower crank case 20a and the upper crank case 20b. The crank shaft 24 extends in the width direction of the vehicle body of the snowmobile. Further, the engine 19 is arranged in a state slightly inclined rearward about the crank shaft 24 so that the cylinder head 22 is disposed below the headlight 16 in the side view. Furthermore, the engine 19 is arranged in the plan view so as to be off-set in one direction, slightly on the left side in the traveling direction of the vehicle body of the snowmobile.

Within the upper crank case 20b having function of the cylinder block 21, cylinders 95 are disposed, into which pistons 96 are slidably inserted in the direction perpendicular to the crank shaft 24. Then, the piston 96 and the crank shaft 24 are connected together with a connecting rod 97 so that the reciprocating stroke of the piston 96 is converted into the rotational movement of the crank shaft 24.

One end of the crank shaft 24, to which the engine 19 is arranged in the off-set manner, i.e., the left end of the illustrated embodiment, protrudes outward the engine 19, and the protruded portion is provided with a drive pulley 27 having a drive clutch 26 constituting a CVT mechanism (continuously variable transmission mechanism) 25 arranged rotatably together with the crank shaft 24. On the other hand, at the rearward of the engine 19, a drive shaft 28 is arranged in parallel with the crank shaft 24, and a driven pulley 30 having a driven clutch 29 constituting another CVT mechanism 25 is provided at an end (left end) of the drive shaft 28 adjacent to the drive pulley 27. Then, between the drive pulley 27 and the driven pulley 30, a clutch belt 31, for example, is stretched around so as to transmit the rotation of the crank shaft 24 to the drive shaft 28.

On the other hand, at the other end (right end) of the drive shaft 28, a drive sprocket, not shown, is arranged, and a drive chain, not shown, is stretched so as to transmit the rotation of the engine 19 to the crawler mechanism 4 between the drive sprocket and a driven sprocket, not shown, provided coaxially and rotatably together with a drive wheel 5 of the crawler mechanism 4. The right end of the drive shaft 28 is provided with a brake disk 32, which is arranged rotatably together with the drive shaft 28, to thereby constitute a brake device 34 together with a brake caliper 33 for braking the crawler mechanism 4.

Figure 7:
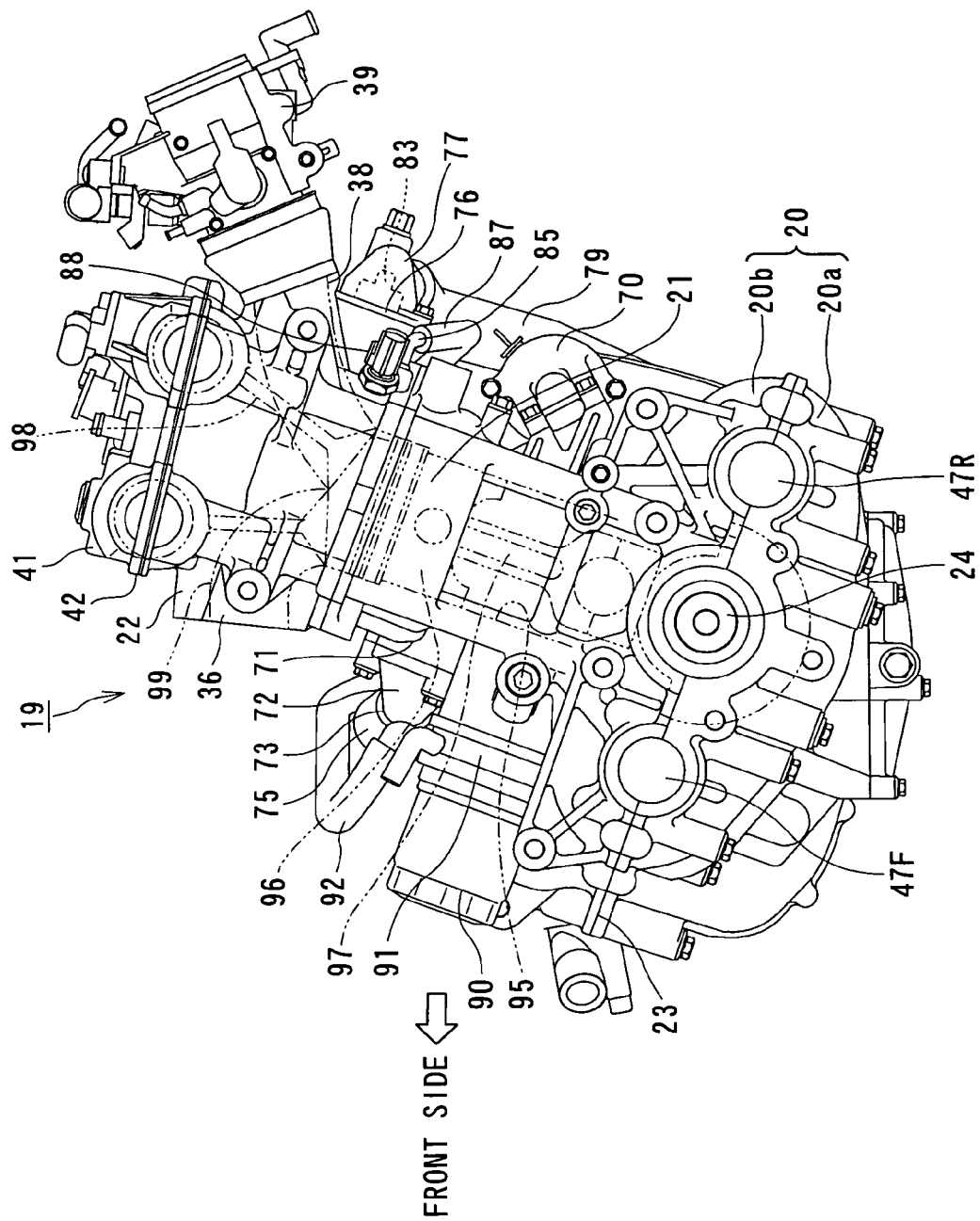
FIG. 7 is a left side view of the engine of FIG. 6.
Figure 8:
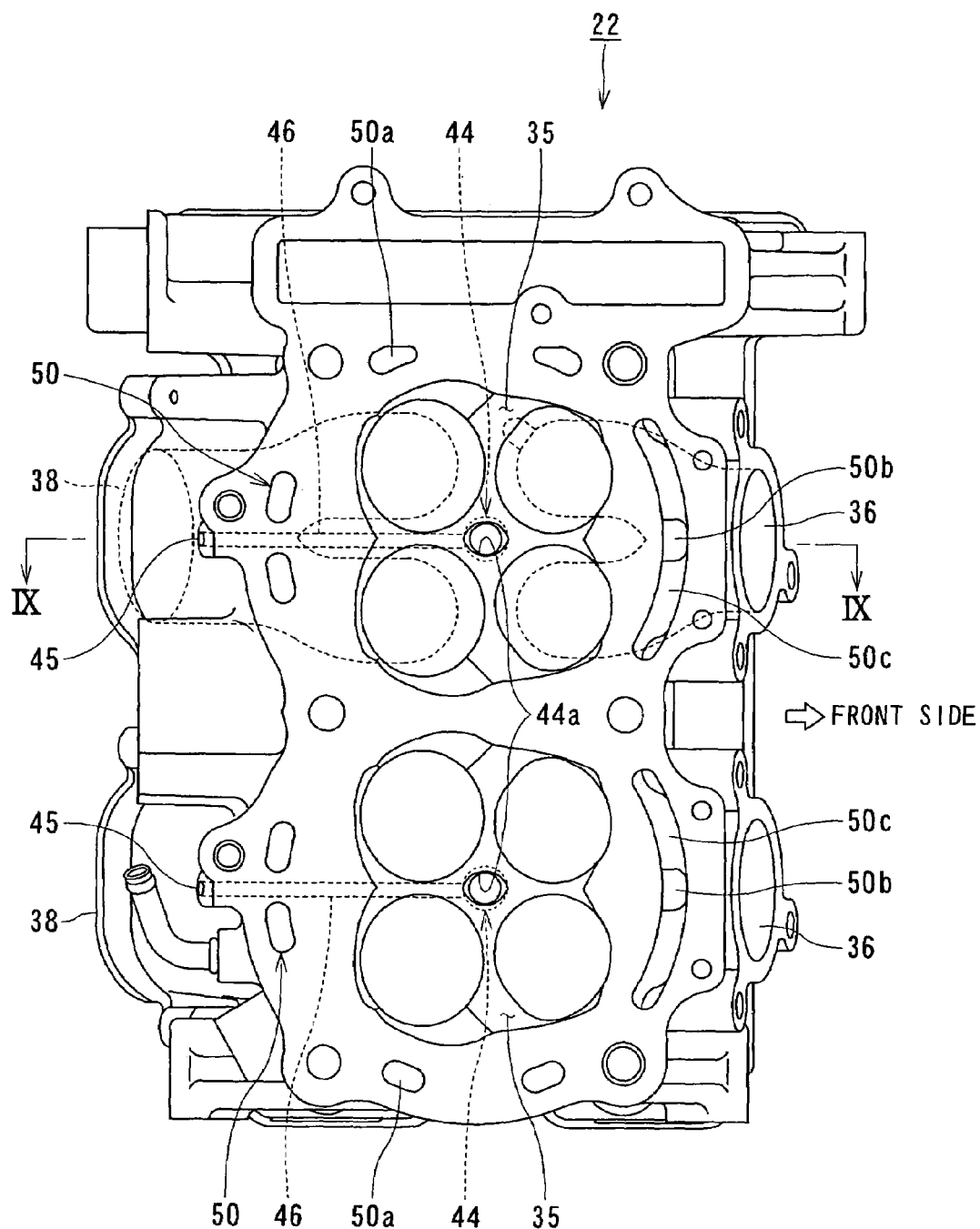
FIG. 8 shows a cylinder head of the engine viewed from a mating side to a cylinder block.
Figure 9:
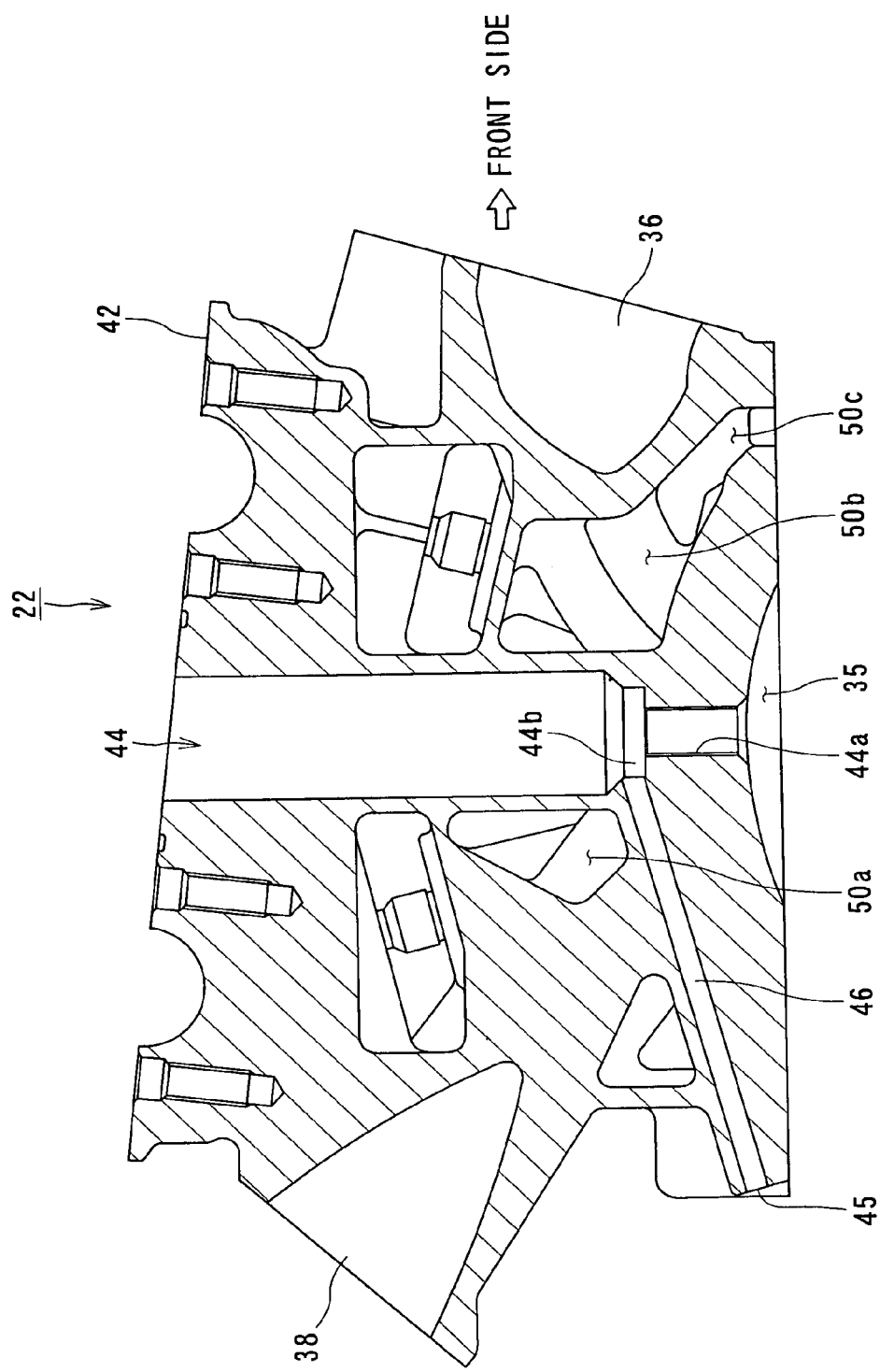
FIG. 9 is a sectional view taken along the line IX—IX in FIG. 8.
Figure 10:
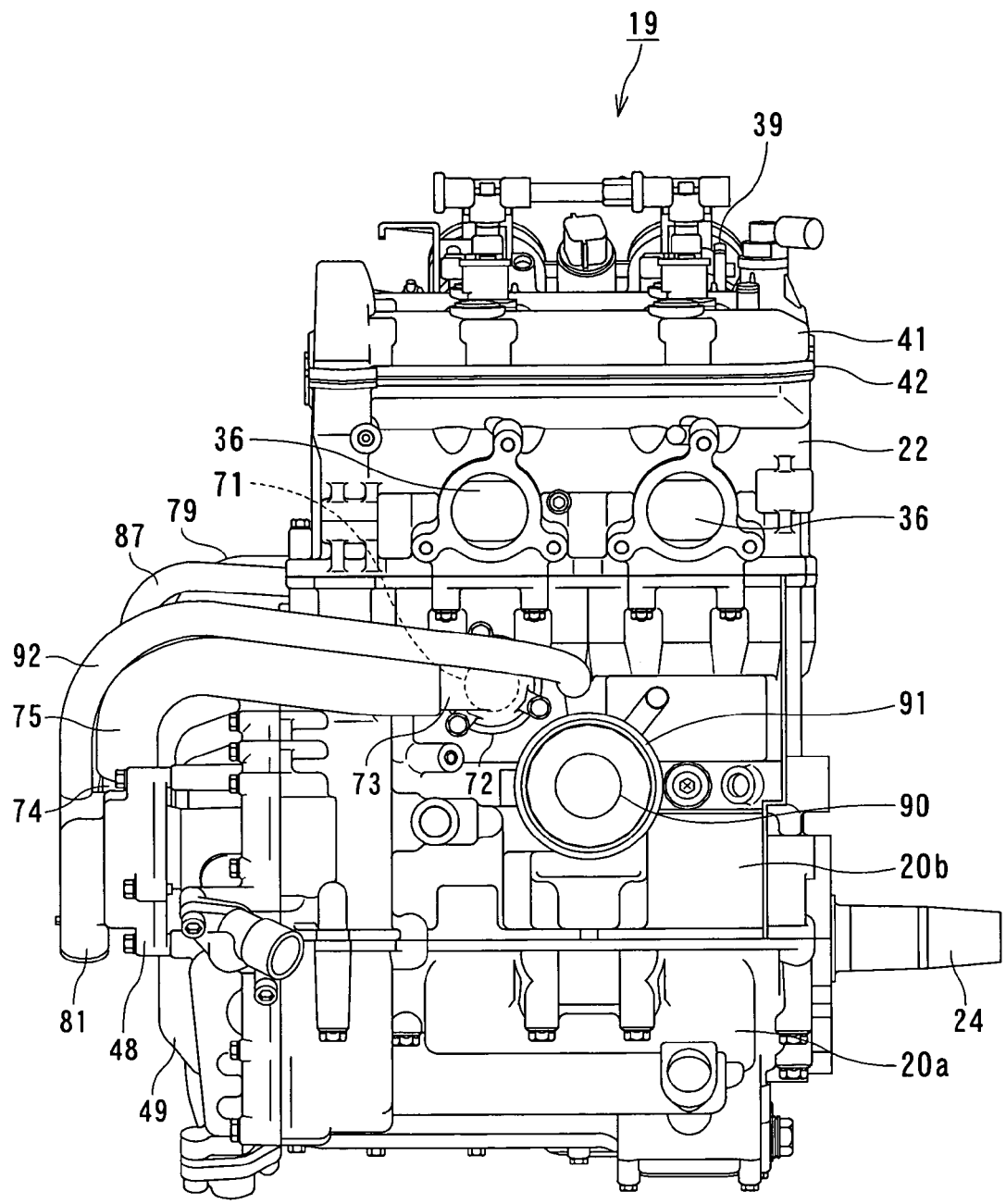
FIG. 10 is a front side view of the engine of the snowmobile in an enlarged scale.
Figure 11:
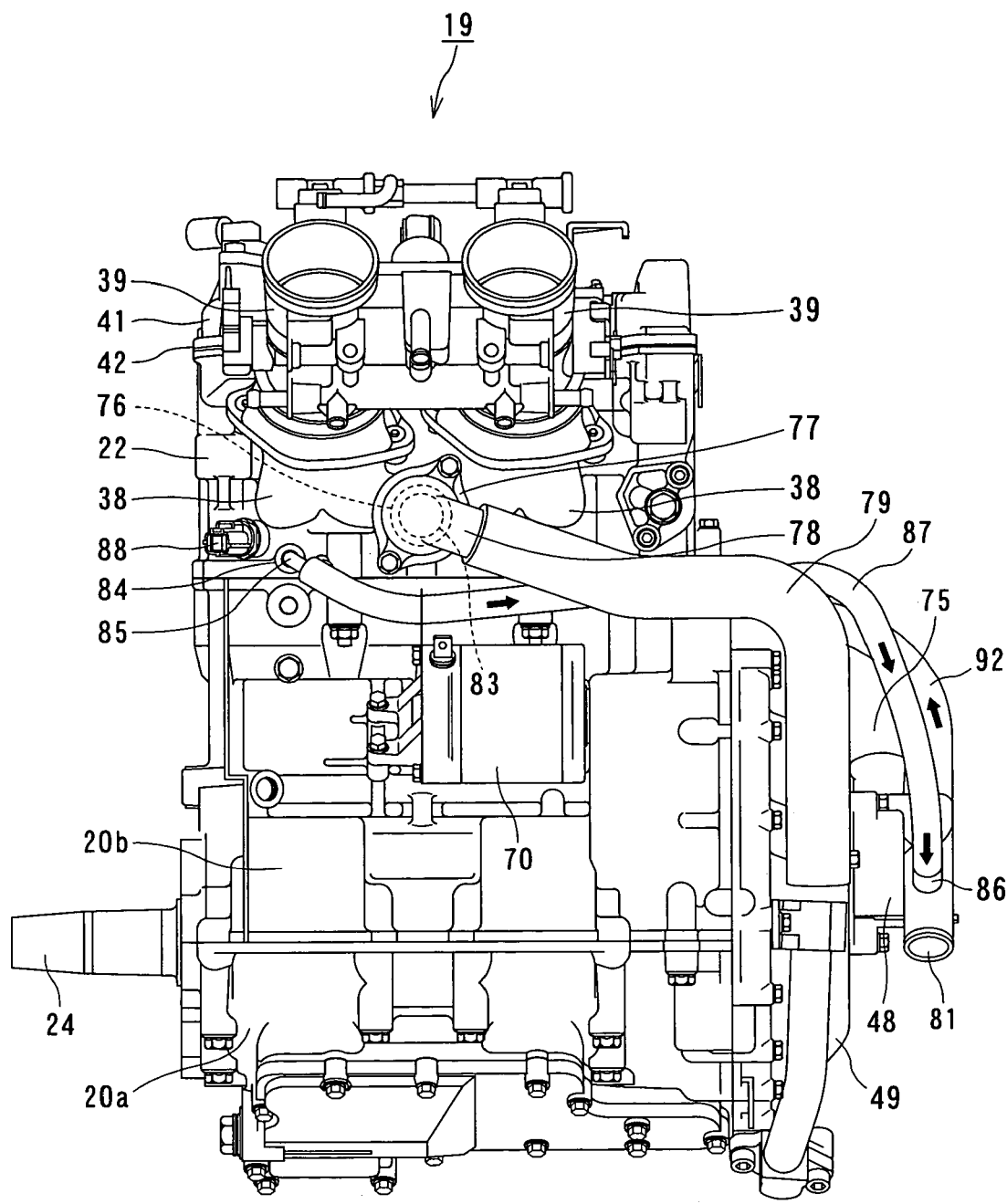
FIG. 11 is a rear side view of the engine of FIG. 10.

As mentioned before, FIG. 6 is a right side view of the engine 19, FIG. 7 is a left side view of the engine 19, showing the cylinder head 22 viewed from the mating surface (junction) to the cylinder block 21, FIG. 8 shows the cylinder head viewed from the mating side to the cylinder block, and FIG. 9 is a sectional view taken along the line IX—IX in FIG. 8.

With reference to these figures, combustion chambers 35 are formed at the juncture portion between the cylinder head 22 and the cylinder block 21 so as to each provide a concave shape conformed to the cylinders 95 of the cylinder block 21. A pair of exhaust ports 36, provided for each cylinder 95, extend from the combustion chambers 35 toward the front surface of the cylinder head 22. Exhaust pipes 37 are connected, respectively, to these exhaust ports 36. The exhaust pipe 37 is rearward bent after once extending in the front side, and at the downstream end of the exhaust pipe 37, a muffler 94 is connected.

On the other hand, a pair of intake ports 38 are provided for each cylinder 95 from each combustion chamber 35 to the back surface of the cylinder head 22, and throttle bodies 39 are connected to the intake ports 38, respectively. In the rear portion of the throttle bodies 39, an air box 40 is provided so as to be connected to the upstream side of the throttle bodies 39. A starter motor 70 is arranged on the rear surface of the upper crank case 20b below the intake ports 38.

Furthermore, within the cylinder head 22, a valve gear, i.e., valve moving mechanism, not shown, is provided for opening/closing intake and exhaust valves 98 and 99 and the upper portion thereof is covered with a head cover 41.

The engine 19 of the present invention is a so-called four-valve engine in which each cylinder 95 has two intake valves 98 and two exhaust valves 99. As shown in FIG. 8, the intake port 38 is divided into two branches along the way from the rear surface of the cylinder head 22 toward the combustion chamber 35. The exhaust port 36 is similarly divided into two branches along the way from the front surface of the cylinder head 22 toward the combustion chamber 35.

The juncture, i.e., mating surface, 42 between the cylinder head 22 and the head cover 41 is formed in a shape inclined slightly downward forward so that the front side (exhaust side) of the cylinder head 22 is lower than the rear side (intake-side) in level. The intake port 38 extends toward the upper rear side while the exhaust port 36 extends downward slightly lower than the horizontal level.

A plug hole 44 is formed for inserting an ignition plug 43 so as to penetrate the center of the combustion chamber 35 of each cylinder 95 from the upper surface of the cylinder head 22, and a threaded portion 44a is formed on the bottom portion of the plug hole 44 connecting to the combustion chamber 35. The upper edge of the thread portion 44a is a radially extending stepped portion 44b, from which a drain passage 46 extends at a downward slant toward a drain hole 45 formed on the rear surface of the cylinder head 22 and directly below the intake port 38 passing through between the intake ports divided into two branches.

The engine 19 includes a balancer device for reducing vibration. This balancer device is a biaxial type having a pair of front-back balancer shafts 47F and 47R arranged in front and back portions so as to be flush with the crank shaft 24 therebetween. Although not shown in detail, the engine 19 includes a dry sump lubrication device having a lubrication oil tank arranged separately from the engine 19. A feed-side oil pump and a scavenging-side oil pump driven by the balancer shaft 47F, are arranged, respectively, above and below the balancer shaft 47F arranged in front of the crank shaft 24.

The engine 19 of the snowmobile 1 of the present invention is also provided with a cooling-water system (called, herein, engine cooling system hereunder), which will be described hereunder with reference to FIGS. 4 to 7 and FIGS. 10 to 11.

The engine cooling system is arranged in front of the engine 19 on the right side thereof and has a water pump 48 driven by the crank shaft 24.

The cooling water pressurized by the water pump 48 is introduced into a cooling water jacket, not shown, disposed in the engine 19 so as to cool various parts or elements of the engine 19.

The water pump 48 is arranged on the side opposite to the CVT mechanism 25 of the engine 19, i.e., on the external surface of a magneto cover 49 covering the right side of the crank case 20 and the cylinder block 21. A drive shaft 48a of the water pump 48 is arranged coaxially with the pump shaft, not shown, of the feed-side oil pump, and the feed-side oil pump and the water pump 48 are simultaneously driven by connecting both the shafts together through the operation of the crank shaft 24.

As shown in FIGS. 8 and 9, the cylinder head 22 is provided with a cooling-water jacket 50 formed therein. The cooling-water jacket 50 is formed in the periphery 50a of the combustion chamber 35, in the intermediate portion 50b between the divided exhaust ports 36 and in the periphery 50c thereof. The cooling water pressurized by the water pump 48 is introduced into the cooling-water jacket 50.

Furthermore, in the illustrated embodiment, the engine cooling system includes a cooling water inlet 71 provided below the exhaust port 36 and on the front surface of the upper crank case 20b and is covered with an inlet cover 72. A cooling-water induction hose 75 is connected to a union joint 73 of the inlet cover 72 and the hose 75 extends from a cooling-water outlet 74 of the water pump 48.

On the other hand, a cooling-water outlet 76 is provided on the rear surface of the cylinder head 22 between lateral cylinders, i.e., in the substantially center of the engine 19 in the width direction. The cooling-water outlet 76 is covered with a thermostat cover 77. Further, a cooling-water exhausting hose 79 extending toward a reservoir tank, not shown, is connected to a union joint 78 of the thermostat cover 77.

A heat exchanger 80 is arranged above and in front of the drive wheel 5 disposed in front of the crawler mechanism 4. A hose, not shown, extending from the reservoir tank is connected to the heat exchanger 80, from which a cooling-water return hose 82 extends toward a cooling-water inlet 81 of the water pump 48.

Within the thermostat cover 77 of the cooling-water outlet 76, there is provided a thermostat 83, and through the operation thereof, the cooling water is drained toward the heat exchanger 80 not until the cooling water reaches a predetermined temperature so as not to circulate the cooling water cooled by the heat exchanger 80 in the cooling water jacket.

Further, a cooling-water bypass outlet 84 is formed to the rear surface of the cylinder head 22 opposite to the thermostat cover 77 with one intake port of the bilateral intake ports 38 therebetween. The bypass outlet 84 is for returning cooling water to the cooling-water jacket to the water pump 48 without interposing the heat exchanger 80 when the thermostat 83 is closed, and a hose union-joint 85 is attached thereto. Then, the hose union-joint 85 and a bypass inlet 86 provided in the cooling-water inlet 81 of the water pump 48 are connected together with a bypass hose 87.

Furthermore, on the rear surface of the cylinder head 22 in the vicinity of the cooling-water bypass outlet 84, there is provided a water-temperature sensor 88.

In addition, a battery 89 is arranged on the right of the engine 19, and an oil filter 90 is arranged in lower front of the engine 19 for filtering lubrication oil of the engine 19. Moreover, in the base portion of a fitting for attaching the oil filter 90, a water-cooled oil cooler 91 is arranged for cooling the lubrication oil, and an oil-cooler hose 92 extending from the water pump 48 is connected thereto.

Next, the operation of the described embodiment of the present invention will be described.

First, concerning the cylinder head structure of the present invention mentioned above, the juncture (mating surface) 42 is formed between the cylinder head 22 so that the head cover 41 in a shape inclines slightly downward toward the front side. Thus, the front side (exhaust side) of the cylinder head 22 is positioned to be lower than the rear side (intake-side). The front side of the engine hood 17 is lowered so that an air resistance is reduced, and the head cover 41 located on the top of the engine 19, the engine hood 17 and the headlight 16 located in the above can be prevented from being interfered with each other.

Moreover, according to the structure described above, the intake port 38 can extend toward the upper rear portion on the rear side of the cylinder head 22 while the exhaust port 36 extending downward slightly lower than, in level, the front side of the cylinder head 22. Furthermore, by extending the intake port 38 toward the upper rear side, the intake port 38 can be constructed to be long and straight so as to provide a so-called down-draft effect, such as a reduced intake resistance, enabling the output power of the engine 19 to be increased.

In addition, since the height of the engine 19 can be reduced without largely inclining the engine 19 in the rear direction, the arrangement and piping of the intake instruments arranged in the rear side of the engine 19, such as the throttle body 39, can be easily conducted.

On the other hand, in the present embodiment, the drain passage 46 extends from the plug hole 44 for inserting the ignition plug 43 toward the drain hole 45 formed on the rear surface of the cylinder head 22 and directly below the intake port 38 passing through between the intake ports 38 divided into two branches. Accordingly, the water entering the plug hole 44 can be smoothly drained, and the cooling-water jacket 50 can be formed in the intermediate portion 50b between the exhaust ports 36 divided into two branches and in the periphery 50e thereof. Thus, the cooling ability of the cylinder head 22 can be improved, suppressing the deformation of the cylinder head 22 due to the exhaust heat.

Although in the described embodiment, the rearward inclined engine 19 is exemplified, substantially the same advantageous functions and effects are obviously obtainable in the adoption of an upstanding engine.

On the other hand, according to the cooling-water system of the engine of the snowmobile of the present invention, the cooling-water outlet 76, the thermostat 83, and the water-temperature sensor 88 are arranged on the rear surface portion of the engine 19, i.e., on the rear surface of the cylinder head 22 on the intake side of the illustrated embodiment, so that the lateral protruding portions of the engine 19, existing in the prior art structure, can be eliminated, thus making compact the engine 19 in the width direction, and hence, increasing the degree of freedom in designing the shape of the engine hood 17. Further, according to the illustrated preferred embodiment, the cooling-water piping extending to the reservoir tank and the heat exchanger 80 and wiring for the water-temperature sensor 88 are arranged toward the rear of the engine 19, so that the interference to the side of the engine 19, i.e., the CVT mechanism 25 arranged on the power output side, can be easily avoided, while the piping and the wiring being simplified and reduced in length.

Moreover, the thermostat 83 is arranged on the rear surface of the cylinder 95 between the bilateral cylinders located in the substantially center of the engine 19 in the width direction above the starter motor 70, which is disposed below the throttle body 39 arrange in the rear of the cylinder head 22 and rear side of the upper crank case 20b. According to this arrangement, the thermostat 83 does not interfere with the intake port 38 and also does not protrude in the rearward direction.

Furthermore, according to the arrangement of the cooling-water bypass outlet 84 and the water-temperature sensor 88 on the rear surface of the cylinder head 22 opposite to the thermostat 83 with one of the lateral intake ports 38 being disposed therebetween, the piping and the wiring can be simplified and reduced in length.

Further, it is to be noted that the present invention is not limited to the described embodiments and many other changes and modifications may be made without departing from the scopes of the appended claims.

What is claimed is:

1. An engine of a snowmobile in which a front half of a snowmobile body is covered by an engine hood so as to form an engine room therein in which a water-cooled engine is transversely mounted, said engine comprising:
   a crank case including an upper crank case half and a lower crank case half which are mated together at mating surfaces thereof;
   a cylinder block disposed above the crank case;
   a cylinder head disposed above the cylinder block; and
   a crank shaft rotatably supported at the mating surfaces of the upper and lower crank case halves in a manner inclined rearward,
   wherein said cylinder head is covered by a head cover so that a mating surface thereof is inclined forward such that a front side of the cylinder head is lower, in level, than a rear side thereof, said cylinder head is formed with a plug hole for inserting an ignition plug and a drain port at the rear side portion thereof, a drain passage is formed so as to extend downward from the plug hole to the drain port, and an exhaust port is branched into two portions between which a cooling water jacket is arranged.

2. An engine of a snowmobile in which a front half of a snowmobile body is covered by an engine hood so as to form an engine room therein in which a water-cooled engine is transversely mounted, the engine hood inclining forward downward of the snowmobile body, said engine comprising:
   a crank case including an upper crank case half and a lower crank case half which are mated together at mating surfaces thereof;
   a cylinder block disposed above the crank case, in which the cylinder is inclined rearward;
   a cylinder head disposed above the cylinder block; and a crank shaft rotatably supported at the mating surface of the upper and lower crank case halves in a manner inclined rearward, wherein said cylinder head is covered by a head cover so that a mating surface of the cylinder head and the cylinder cover is inclined forward with respect to a mating surface between the cylinder head and the cylinder block such that a front side of the cylinder head is lower, in level, than a rear side thereof, and the cylinder head is provided with an intake port extending upward from a rear side portion of the cylinder head.

3. The engine of a snowmobile according to claim 2, wherein said cylinder head is provided with an exhaust port extending downward from a horizontal plane from a front side portion of the cylinder head, said intake port is connected to a throttle body, and said cylinder head is further provided with a thermostat below the throttle body and at a rear surface of the cylinder head.

4. The engine of a snowmobile according to claim 3, wherein said cylinder head is formed with a plug hole for inserting an ignition plug and a drain port at the rear side portion thereof, a drain passage is formed so as to extend downward from the plug hole to the drain port, and an exhaust port is branched into two portions between which a cooling water jacket is arranged.

5. An engine of a snowmobile in which a front half of a snowmobile body is covered by an engine hood so as to form an engine room therein in which a water-cooled engine is transversely mounted, said engine comprising:

a crank case including an upper crank half case and a lower crank case half which are mated together at mating surfaces thereof;

a cylinder block disposed above the crank case;

a cylinder head disposed above the cylinder block; and a crank shaft rotatably supported at the mating surface of the upper and lower crank case halves in a manner inclined rearward, wherein said cylinder head is provided, at a rear side portion thereof, with a cooling water outlet and a thermostat, and said thermostat is arranged above a starter motor disposed below a throttle body disposed on a rear upper portion of the engine, below the engine rear portion, and between bilateral cylinders of the engine.

6. The engine of a snowmobile according to claim 5, wherein a plurality of intake ports are formed to a rear surface portion of the cylinder head, and a bypass outlet port of cooling water and a temperature sensor for cooling water are disposed to rear surface portions of the cylinder head, said bypass outlet port and said temperature sensor being arranged to be opposite to the thermostat with one of the intake ports interposed therebetween.

7. The engine of a snowmobile according to claim 5, wherein an intake port extends toward an upper rear portion on a rear side of the cylinder head, and an exhaust port extends downward slightly lower than, in level, a front side of the cylinder head, such that the intake port can be constructed to be substantially long and straight so as to provide a down-draft effect to reduce intake resistance and to enable an output power of the engine to increase.

8. The engine of a snowmobile according to claim 5, wherein said cylinder head is formed with a plug hole for inserting an ignition plug and a drain port at the rear side portion thereof, a drain passage is formed so as to extend downward from the plug hole to the drain port, and an exhaust port is branched into two portions between which a cooling water jacket is arranged.

9. The engine of a snowmobile according to claim 5, wherein said cylinder head is provided with an intake port extending upward from a rear side portion of the cylinder head and an exhaust port extending downward from a horizontal plane from a front side portion of the cylinder head.

* * * * *